Patented Mar. 5, 1929.

1,704,308

UNITED STATES PATENT OFFICE.

BERTRAND SZILARD, OF PARIS, FRANCE.

POLISHING AND GRINDING MATERIAL.

No Drawing. Application filed June 14, 1924, Serial No. 720,121, and in France June 18, 1923.

Polishing materials hitherto used and among which may be mentioned oxid of iron, oxid of zinc, oxid of tin, carborundum, ruby powder etc. are substances characterized by the property they possess of being comparatively hard and obtainable as fine powders; this double property is what has to be sought for in any polishing material, allowing, as it does, the required polish to be produced on such bodies as metals, stones, glass, wood, leather, slates, horn, celluloid, ivory, teeth, nails, etc.

Said polishing powders give widely different results according to their nature, the size of their grain and according also to the various substances such as carbonate of lime, soaps, alkalis, acids, fat solvents, gelatine, gums, etc. added thereto; they cause a more or less high polish to be obtained with more or less rapidity. Actual results, however, depend upon the two above stated qualities, namely: fineness and hardness of grain.

Now the polishing materials known hitherto seldom have a very fine grain since most of them are obtained by ignigenous means the effect of which is to agglomerate grains, and, on the other hand, bar a few exceptions, such materials do not always offer sufficient hardness.

Furthermore, such materials involve the drawback of having a colour of their own which can only be modified by adding to the polishing powder certain pigments which, while they have to be intimately mixed with the powder, yet do not become combined with the polishing material itself, but are merely mixed up therewith.

The purpose of my invention is to do away with the above set forth drawbacks. Its object is to utilize as polishing material salts of titanium in general and oxid of titanium in particular, such salts being usable for polishing either when used alone or mixed together or mixed with any other substances. As a matter of fact, oxid of titanium is very hard, and, besides, is obtainable in the form of an extremely fine powder because it can be prepared both by a wet or a semi-wet process by precipitation of a colloidal solution.

This product does therefore offer to the highest possible degree the two qualities sought for in a good polishing powder.

The other salts of titanium offer analogous properties.

On the other hand, the basic salts and the oxids of titanium have the property of behaving like lacquers; they can be coloured previous to being precipitated and while still in solution, by means of the usual colouring matters such as alizarin, aniline, vegetable pigments etc. The obtained precipitated salt of titanium takes with it the colouring matter with which it remains combined.

These salts may be used for polishing any substances: metals, wood, gems, precious and other stones, ebonites, marbles, varnished surfaces, leather, hides, bones, nails, teeth, glass, optical glasses etc. They can also serve for boring, grinding and lapping and be used, for instance, as a razor paste; said salts may be used pure, alkaline, or acid, embodied in soaps, fats, waxes, rosins, alcohols, glycerin etc. and either in solid, pasty or liquid form.

Having now particularly ascertained and described the nature of my said invention as well as the manner in which the same is to be performed, I declare that what I claim is:

1. A polishing and grinding material, consisting substantially of a mixture in powder form of titanium oxid and another titanium salt, both salts being in an unroasted condition.

2. The process of producing a polishing and grinding material, comprising the steps of preparing a solution from unroasted titanium ore; and precipitating such solution to obtain an extremely fine powder.

3. The process of producing a polishing and grinding material, comprising the steps of mixing titanium oxid and another titanium salt, both in unroasted condition; preparing a colloidal solution from such mixture; and precipitating said colloidal solution to obtain an extremely fine powder.

In testimony whereof I affix my signature.

BERTRAND SZILARD.